United States Patent [19]

Inaba et al.

[11] Patent Number: 4,576,537
[45] Date of Patent: Mar. 18, 1986

[54] ROBOT SYSTEM

[75] Inventors: Hajimu Inaba, Hino; Nobutoshi Torii, Hachioji, both of Japan

[73] Assignee: Fanuc Ltd., Minamitsuru, Japan

[21] Appl. No.: 714,345

[22] Filed: Mar. 21, 1985

Related U.S. Application Data

[63] Continuation-in-part of Ser. No. 396,613, Jul. 9, 1982, abandoned.

[30] Foreign Application Priority Data

Jul. 14, 1981 [JP] Japan .................................. 56-109567

[51] Int. Cl.⁴ ............................. B25J 9/00; B23Q 7/04
[52] U.S. Cl. .................................... 414/222; 414/118;
414/736; 414/589; 901/7
[58] Field of Search ................. 198/345; 414/589, 736,
414/118, 222; 901/7

[56] References Cited

U.S. PATENT DOCUMENTS 3,998,316 12/1976 Kamm ................................... 198/344
4,042,124 8/1977 Bowdry, III et al. .............. 414/118
4,402,393 9/1983 Kent ..................................... 198/345

FOREIGN PATENT DOCUMENTS 2444124 4/1976 Fed. Rep. of Germany .
2710661 9/1978 Fed. Rep. of Germany .
2101097 1/1983 United Kingdom ................ 414/118

*Primary Examiner*—Terrance L. Siemens
*Attorney, Agent, or Firm*—Staas and Halsey

[57] ABSTRACT

A robot system for use with a machine tool having a spindle, comprising a robot having a body for being mounted on the machine tool, an arm pivotally mounted on the body and rotatable in a plane transverse to an axial direction of the spindle of the machine tool, and a hand mounted on a distal end of said arm for gripping a workpiece for transfer to the machine tool, and a workpiece feeder disposed adjacent to the robot and movably supporting a succession of pallets for carrying unmachined and machined workpieces thereon. The workpiece feeder includes a first mechanism for moving the pallets along a path on the workpiece feeder and for positioning the pallets one at a time in a position in which an unmachined workpiece can be picked up from the pallet by the hand or a machined workpiece can be unloaded from the hand onto the pallet, and a second mechanism for moving the pallet toward the hand in the position for allowing the and to pick up the unmachined workpiece and to unload the machined workpiece, and for moving the pallet away from the hand.

2 Claims, 18 Drawing Figures

NORMAL ←
→ REVERSE

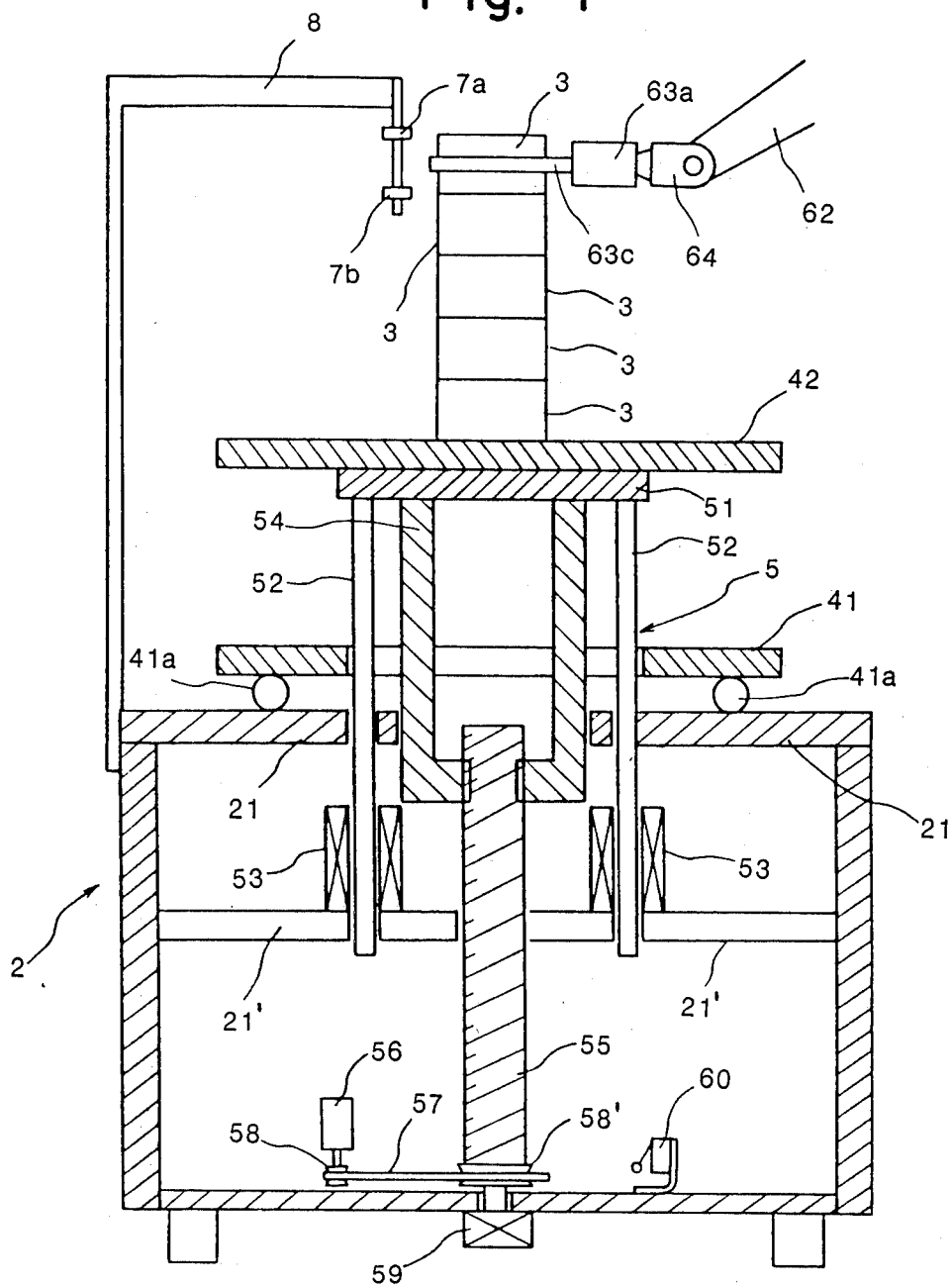

ROBOT SYSTEM

This is a continuation-in-part of co-pending application Ser. No. 396,613 filed on July 9, 1982, now abandoned.

BACKGROUND OF THE INVENTION

The present invention relates to a robot system, and more particularly to a robot system for use in a small-size industrial robot having a gripper arm which is unable to move perpendicularly toward a pallet on which workpieces are placed, or for use in a robot having no axis about which the gripper arm could angularly move for loading or unloading workpieces onto or from the pallet.

Industrial robots usually have a gripper arm extending from a robot body and include a gripper or hand on its distal end. The gripper serves to grip a workpiece placed on a pallet and to transfer the workpiece to another location via a predetermined path of movement. Such industrial robots are relatively large in size, and in ordinary installations a single industrial robot is located in the vicinity of a plurality of machine tools to service them. With recent rapid development of industrial robots, an increasing number of industrial robots is finding widespread use in small-scale factories and machine shops which have a relatively small work space. Since, however, such small-scale factories have only a limited number of machine tools of less diversified types, there is no strong demand in such machine shops for large-size industrial robots each capable of servicing several machine tools. Instead, the smaller factories prefer a small-size industrial robot which is effective enough to service a single machine tool. Large-size plants also find small-size industrial robots more advantageous for an increased rate of production for some applications in which a single machine tool is serviced by a single, less costly smaller industrial robot.

Conventional industrial robots however fail to meet the foregoing demands as they are dimensionally large, take up a large space, and are quite expensive.

SUMMARY OF THE INVENTION

Accordingly, it is an object of the present invention to provide an industrial robot system which takes up a relatively small space for installation, is simple in structure, small in size, and less costly to construct.

Another object of the present invention is to provide a small-size industrial robot whose gripper arm moves along a single axis and rotates in a plane transverse to the axis in order to load and unload workpieces onto and from pallets.

Still another object of the present invention is to provide a small-size robot system for supplying an industrial robot with unmachined workpieces or receiving machined workpieces from the industrial robot by moving workpiece feeder pallets upwardly and downwardly.

A still further object of the present invention is to provide a robot system capable of easily positioning workpiece feeder pallets in a vertical direction.

Accordingly, the present invention is directed to a robot system for use with a machine tool having a spindle comprising a robot having a body for being mounted on the machine tool, an arm pivotally mounted on the body and rotatable in a plane transverse to an axial direction of the spindle of the machine tool, and a hand mounted on a distal end of said arm for gripping a workpiece and transferring the workpiece to the machine tool, and a workpiece feeder disposed adjacent to the robot and movably supporting a succession of pallets for carrying unmachined and machine workpieces thereon. The workpiece feeder includes a first mechanism for moving the pallets along a path on the workpiece feeder and for positioning the pallets one at a time in a position in which an unmachined workpiece can be picked up from the pallet by the hand or a machined workpiece can be unloaded from the hand onto the pallet, and a second mechanism for moving the pallet toward the hand in the position for allowing the hand to pick up the unmachined workpiece and to unload the machined workpiece, and for moving the pallet away from the hand.

The above and other objects, features and advantages of the present invention will be apparent from the following description when taken in connection with the accompanying drawings.

BRIEF DESCRIPTION OF THE DRAWINGS

FIG. 4 is a vertical cross-sectional view of a pallet lifting mechanism;

DESCRIPTION OF THE PREFERRED EMBODIMENTS

Figure 1:
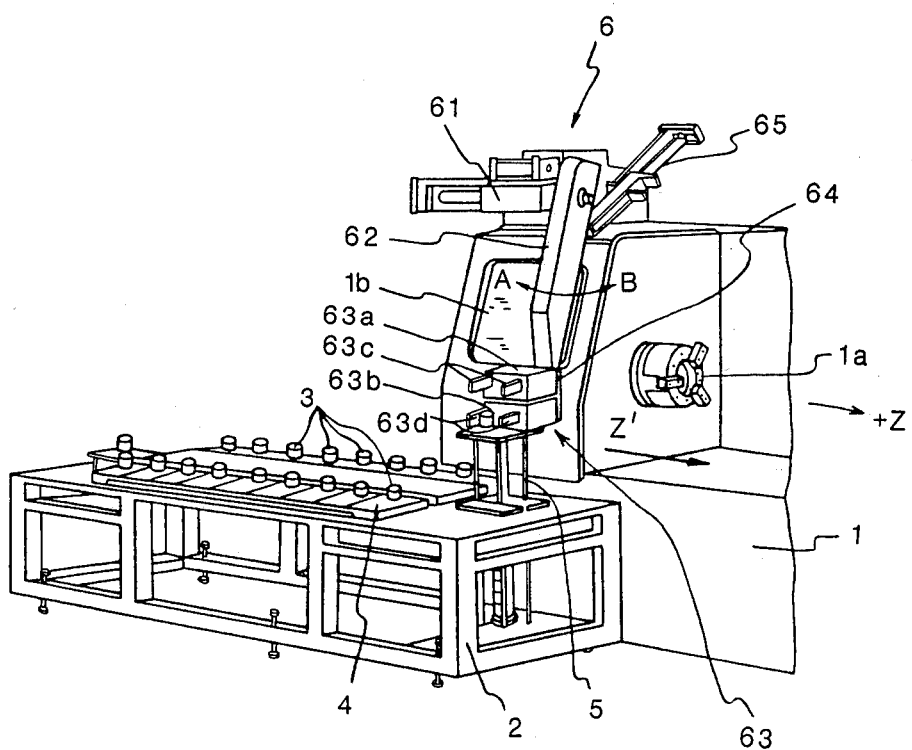
FIG. 1 is a perspective view of a robot system according to the present invention.

As shown in FIG. 1, a robot system according to the present invention includes a robot 6 installed on and above a machine tool 1 having a chuck 1a coupled for co-rotation with a spindle (not shown), the chuck 1a serving to hold a workpiece 3 as transferred by the robot 6 as will be described later on. The machine tool 1 also has a cover 1b which moves in the direction of the arrow z' and covers the chuck 1a and other moving parts associated therewith while the workpiece held by the chuck 1a is being machined.

A rotary workpiece feeder 2 is located adjacent to the machine tool 1 and the robot 6, and is composed of iron frames assembled in the form of a table on which a plurality of pallets 4 for carrying workpieces 3 thereon are movably supported. The pallets 4 are drivable by a driver (later described) to travel along a substantially elliptical path on an upper surface of the workpiece feeder 2, and movable one at a time upwardly by a pallet lifting mechanism 5 when the pallets 4 reach a position on the workpiece feeder 2 in which workpieces are gripped by or released from a workpiece gripper of the robot 6.

The robot 6 includes a robot body 61 actuatable by an air cylinder (not shown) to move in the axial direction of the spindle of the machine tool 1 or in the direction of a z-axis, a gripper arm 62 pivotally supported on the robot body 61, a double hand 63, a wrist 64, and an air cylinder 65 pivotally mounted on the robot body 61. The double hand 63 is composed of a pair of first and second grippers 63a, 63b disposed one on the other and rotatable in unison by a wrist rotating mechanism, the first and second grippers 63a, 63b having pairs of spaced fingers 63c, 63d, respectively, which are independently openable and closable. The wrist 64 is affixed to a holder plate mounted on a distal end of the arm 62 and is rotatable by the wrist rotating mechanism. The air cylinder 65 includes a piston rod having a projecting end pivotally coupled to the arm 62 for angularly moving the latter about the pivot thereof. Although not shown, a pair of first and second air tubes is connected respectively to piston-side and rod-side chambers in the air cylinder 65. When air under pressure is supplied through the first air tube into the piston-side chamber, the piston rod extends to turn the arm 62 about its pivot in the direction of the arrowhead A. Conversely, when the rod-side chamber is supplied with air under pressure via the second air tube, the piston rod is retracted to angularly move the arm 62 in the direction of the arrowhead B.

The angular interval which the arm 62 should travel, and the distance that the robot body 6 should move in the axial direction of the spindle of the machine tool 1, can be determined by limit switches and stops (not illustrated) which depend on the position that the pallet 4 assumes when raised by the pallet lifting mechanism 5 and the position of the chuck 1a. With the arm 62 and the robot body 6 being thus controlled in their motion, workpieces can reliably be attached to or detached from the chuck 1a by the arm 62.

Figure 2A:
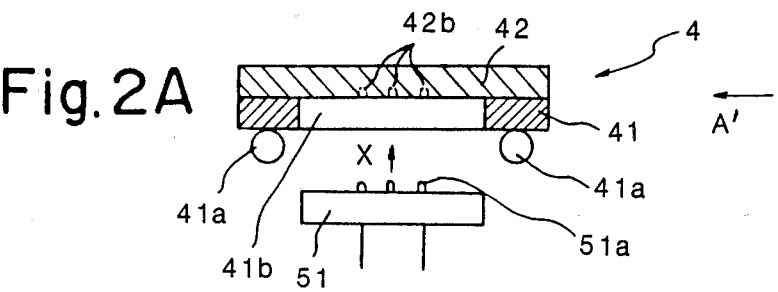
FIG. 2A is a cross-section view of a pallet for carrying a workpiece thereon.
Figure 2B:
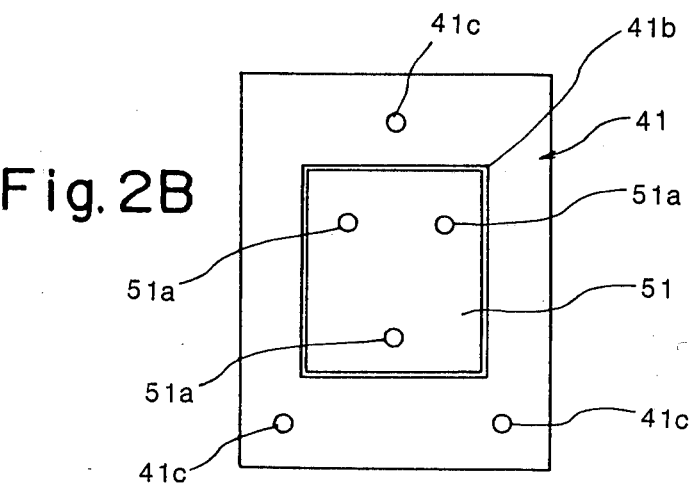
FIGS. 2B and 2C are plan views of pallet members.
Figure 2C:
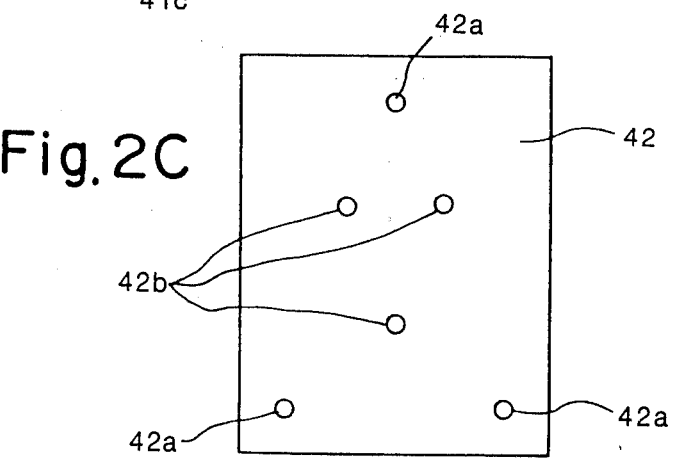
Figure 3A:
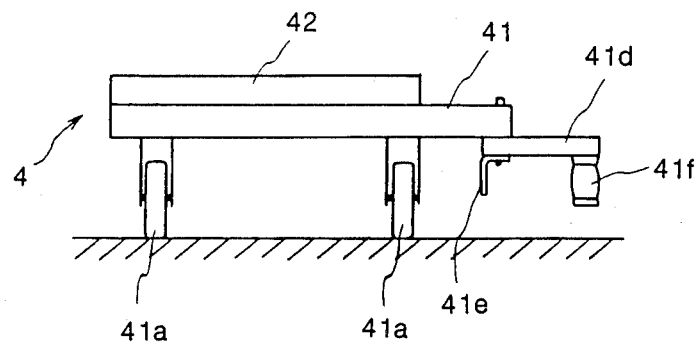
FIG. 3A is a side elevational view taken in the direction of arrow A of FIG. 2A.
Figure 3B:
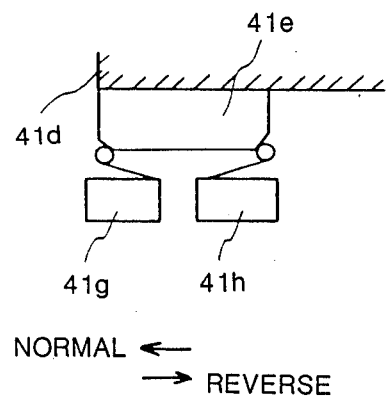
FIG. 3B is a front elevation view of a dog mounted on the pallet shown in FIG. 3A.

As shown in FIGS. 2A through 2C, and FIGS. 3A and 3B, each pallet 4 comprises a lower pallet member 41 and an upper pallet member 42 mounted on the lower pallet member 41 for carrying a workpiece 3 thereon. The lower pallet member 41 has rollers 41a on its four lower corners, a central through opening 41b for passage therethrough of a lifter table 51 of the pallet lifting mechanism 5 for lifting the upper pallet member 42, and three pins 41c (FIG. 2B) spaced around the central opening 41b. As illustrated in FIGS. 3A and 3B, a support 41d is screwed to a lower surface of the lower pallet member 41 at an edge thereof and supports a dog 41e and a chain 41f. The dog 41e is positioned such that it will engage a pair of limit switches 41g, 41h disposed in the pallet driver, the limit switch 41g serving to enable the pallet driver to be actuated in one direction and the limit switch 41f to enable the pallet driver to be actuated in the opposite direction. The upper pallet member 42 has, as shown in FIG. 2C, a first set of three holes 42a in which the pins 41c on the lower pallet 41 are respectively fitted, and a second set of three holes 42b in which three pins 51a on the lifter table 51 can respectively be fitted.

When the lifter table 51 is raised in the direction of the arrow x as shown in FIG. 2A, the lifter table 51 moves through the central opening 41b in the lower pallet member 41 until the pins 51a fit respectively into the holes 42b in the upper pallet member 42. Continued upward movement of the lifter table 51 causes the upper pallet member 42 to ascend therewith. When the chain 41f is driven by the pallet driver to move in one or opposite direction perpendicular to the sheet of FIG. 3A, the pallet 4 moves with the chain 41f along the elliptical path on the workpiece feeder 2.

The pallet lifting mechanism 5 comprises, as shown in FIG. 4, the lifter table 51 for raising the upper pallet member 42 as described above. The lifter table 51 has on its upper surface the pins 51a that can fit into the holes 42b in the upper pallet member 42 as shown in FIG. 2A. On a lower surface of the lifter table 51, there are attached four guide rods 52 at four corners of the lifter table 51 which extend through a frame 21 of the workpiece feeder 2. The workpiece feeder 2 includes an intermediate frame 21' on which there are mounted bearings 53 guiding the guide rods 52 to move therethrough. Lifter bars 54 extend downwardly from the lifter table 51 and have lower ends threaded. A lifter screw 55 threadedly engages the threaded lower ends of the lifter bars 54 and is operatively coupled with a motor 56 through a timing belt 57 and pulleys 58, 58'. When the motor 56 is energized, the lifter screw 55 is rotated about its own axis to cause the lifter bars 54 and hence the lifter table 51 to be lifted or lowered dependent on the direction of rotation of the lifter screw 55. Thus, such vertical movement of the lifter table 51 can move the upper pallet member 42 vertically therewith. The lifter screw 55 can be braked against rotation by a brake 59 operatively coupled with a lower end thereof. When one of the guide rods 52 is lowered into engagement with a limit switch 60, the latter causes the motor 56 to be de-energized, thus stopping downward movement of the lifter table 51. The limit switch 60 therefore serves as a switch for detecting completion of downward movement of the lifter table 51. The motor 56 may be either an AC motor or a DC motor.

A pair of vertically spaced sensors 7a, 7b is mounted on an attachment bar 8 secured to the workpiece feeder 2 and extending in overhanging relation to the lifter table 51. The sensors 7a, 7b serve to detect an uppermost one of workpieces 3 placed on the lifter table 42 as the latter ascends. More specifically, the sensor 7a detects an uppermost unmachined workpiece to de-energize the motor 56 when such unmachined workpieces are to be gripped by the robot 6. The sensor 7b detects an uppermost machined workpiece to de-energize the motor 56 when such machined workpieces are to be unloaded by the robot 6.

In order for the robot 6 to grip unmachined workpieces, the motor 56 is driven under a table lifting command from a robot control system (later described) to rotate in one direction to lift the upper pallet member 42, and is turned off in response to detection of an uppermost unmachined workpiece 3 by the sensor 7a. The motor 56 is then rotated in the opposite direction under a table lowering command from the robot control system after the unmachined workpiece 3 has been held by the robot 6, thereby lowering the upper pallet member 42. The motor 56 is turned off when the guide rod 52 hits the limit switch 60, whereupon the downward movement of the lifter table 51 is completed.

When machined workpieces are to be transferred from the robot 6 onto the upper pallet member 42, the motor 56 is driven under the table lifting command from the robot control system to cause the upper pallet member 42 to ascend. The motor 56 is turned off when the sensor 7b detects an uppermost machined workpiece. After the machined workpiece has been unloaded from the robot 6, the robot control system issues the table lowering command to drive the motor 56 in the opposite direction for thereby moving the upper pallet member 42 downwardly. The motor 56 is de-energized when the limit switch 60 is actuated by the guide rod 52 moving downwardly.

Figure 5:
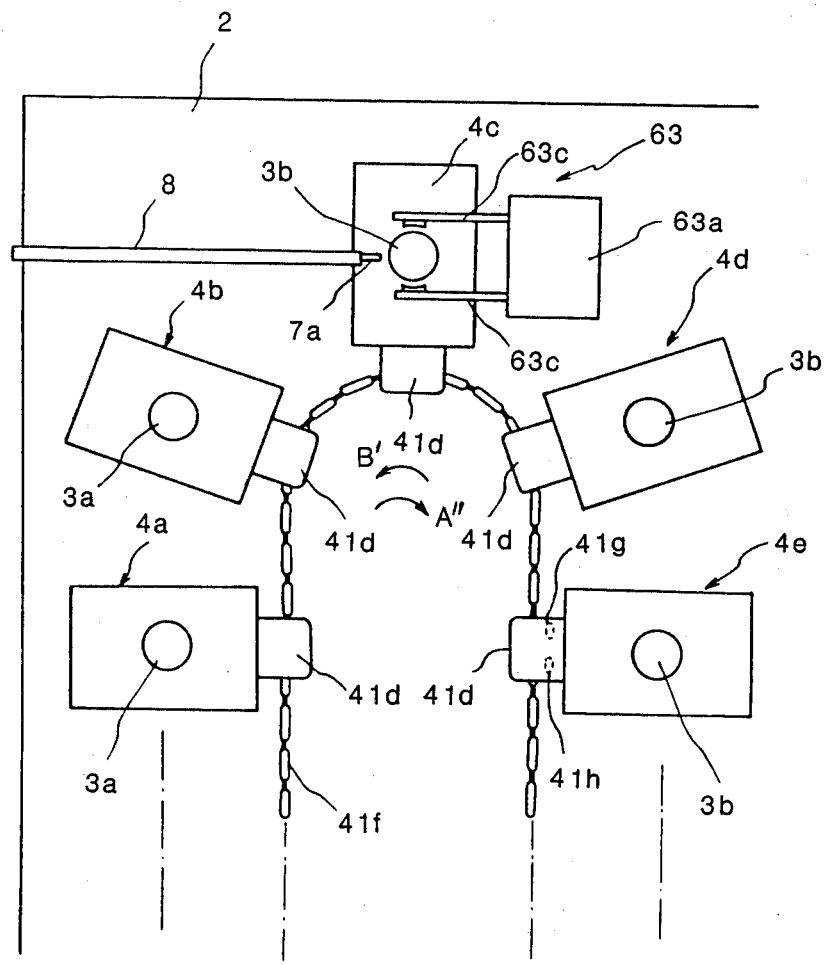
FIG. 5 is a fragmentary plan view of a workpiece feeder.

As shown in FIG. 5, the workpiece feeder 2 supports thereon a multiplicity of pallets 4a, 4b, 4c, 4d, 4e, ... on which machined workpieces 3a, 3a and unmachined workpieces 3b, 3b, 3b are placed. The sensor 7a (7b) is supported on the attachment bar 8 in overhanging relation to one of the pallets which arrives at the workpiece loading and unloading position that is shown as being taken by the pallet 4c. The pallets have supports 41d mounted thereon and held in engagement with the chain 41f. When the chain 41f is driven to move along in one direction or the other as shown by the arrows A" and B', the pallets move therewith. The limit swtiches 41g, 41h are mounted on the workpiece feeder 2 at a position which the support 41d of the pallet 4e is shown as taking. The limit switches 41g, 41h are now located under the support 41d. A desired pallet can be located in the workpiece loading and unloading position by cooperation of the limit switches 41g, 41h with the dog 41e (FIG. 3B) mounted on the support 41d.

Figure 6:
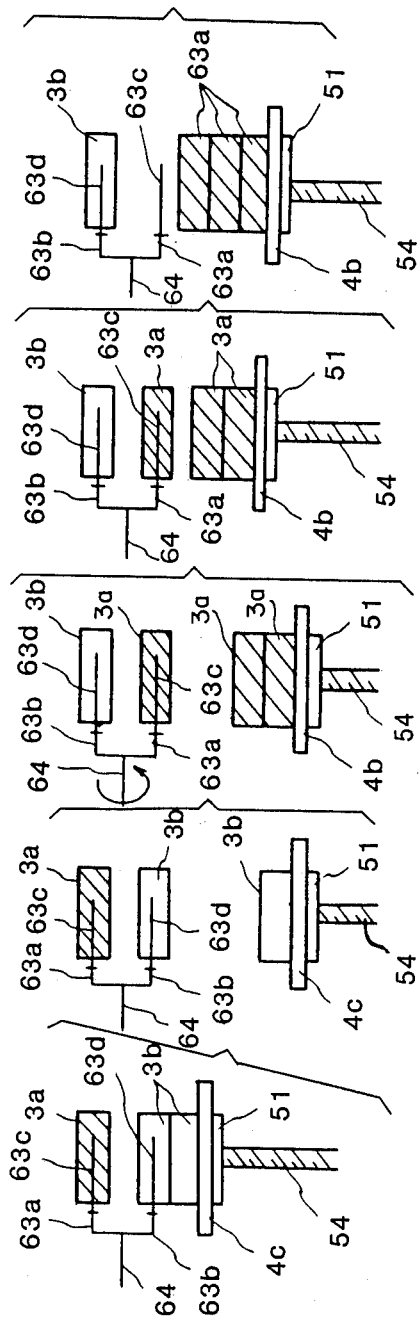
FIGS. 6A through 6E are side elevational views showing progressive steps of workpiece palletizing operation.

FIGS. 6A through 6E illustrate successive steps of a palletizing operation for unloading a machined workpiece 3a onto the pallet and picking up an unmachined workpiece 3b from the pallet. The palletizing operation will now be described in detail. After the double hand 63 of the robot 6 has been brought to the workpiece loading and unloading position above the pallet 4c (as shown in FIG. 5), the upper pallet member of the pallet 4c on which unmachined workpieces 3b are placed is raised. When the sensor 7a detects an uppermost unmachined workpiece 3b, the upward movement of the upper pallet member of the pallet 4c is arrested. The uppermost unmachined workpiece 3b is now transferred to the second gripper 63b as shown in FIG. 6A. The fingers 63d of the second gripper 63b are closed to grip the uppermost unmachined workpiece 3b. Then, the upper pallet member of the pallet 4c is lowered as illustrated in FIG. 6B until the limit switch 60 (FIG. 4) is actuated by the guide rod 52. During such downward movement of the upper pallet member, the first and second grippers 63a, 63b are switched around or turned 180 degrees about the axis of the wrist 64 so that the first gripper 63a will be in a lower position and the second gripper 63b in an upper position, as shown in FIG. 6C.

When the upper pallet member of the pallet 4c has been fully lowered, the chain 41f is moved along in the direction of the arrow A" (FIG. 5) under a pallet reversing command from the robot control system until the dog 41e of the pallet 4d actuates the limit switch 41h (FIG. 5). The movement of the chain 41f is stopped in response to engagement of the dog 41e with the limit switch 41h, whereupon the pallet 4b which carries machined workpieces 3b thereon is located in the workpiece loading and unloading position. Then, the robot control system issues a pallet lifting command to raise the upper pallet member of the pallet 4b as shown in FIG. 6D until the sensor 7b detects an uppermost one of the machined workpieces 3a. After the upward movement of the upper pallet member of the pallet 4b has been completed, the fingers 63c of the first gripper 63a are opened to release a machined workpiece 3a onto the uppermost machined workpiece 3a on the upper pallet member of the pallet 4b thus lifted, as illustrated in FIG. 6E. Upon completion of unloading of the machined workpiece from the gripper 63a, the upper pallet member of the pallet 4b is lowered until the limit switch 60 is actuated. Then, the robot control system issues a pallet feeding command to cause the chain 41f to travel along in the direction of the arrow B' (FIG. 5) until the limit switch 41g is actuated by the dog 41e of the pallet 4e. When the limit switch 41g is actuated, the movement of the chain 41f is arrested to bring the pallets 4a, 4b, . . . to the position shown in FIG. 5.

At an initial stage of operation of the robot system, all of the pallets except one carry thereon N unmachined workpieces, and the empty pallet is positioned at the location of the pallet 4b shown in FIG. 5. When N unmachined workpieces on a pallet following the empty pallet have been machined and transferred to the empty pallet according to the operation described above with reference to FIGS. 6A through 6E, the next pallet becomes empty until N machined workpieces have been transferred from a succeeding pallet. The pallet which has been emptied each time N unmachined workpieces are machined is moved to the position of the pallet 4b shown in FIG. 5.

Figure 7:
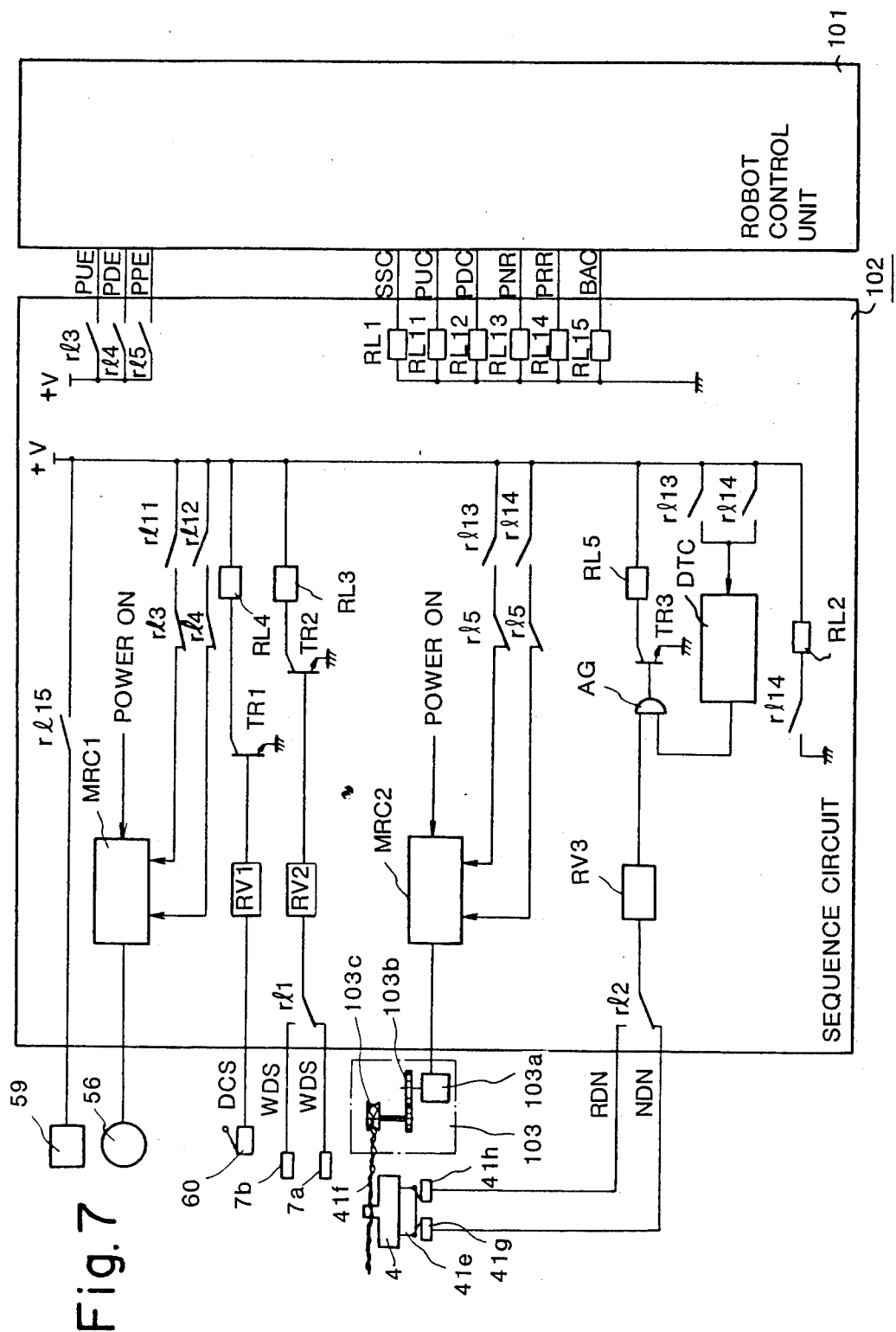
FIG. 7 is a circuit diagram of a sequence control system for controlling the workpiece palletizing operation.
Figure 8:
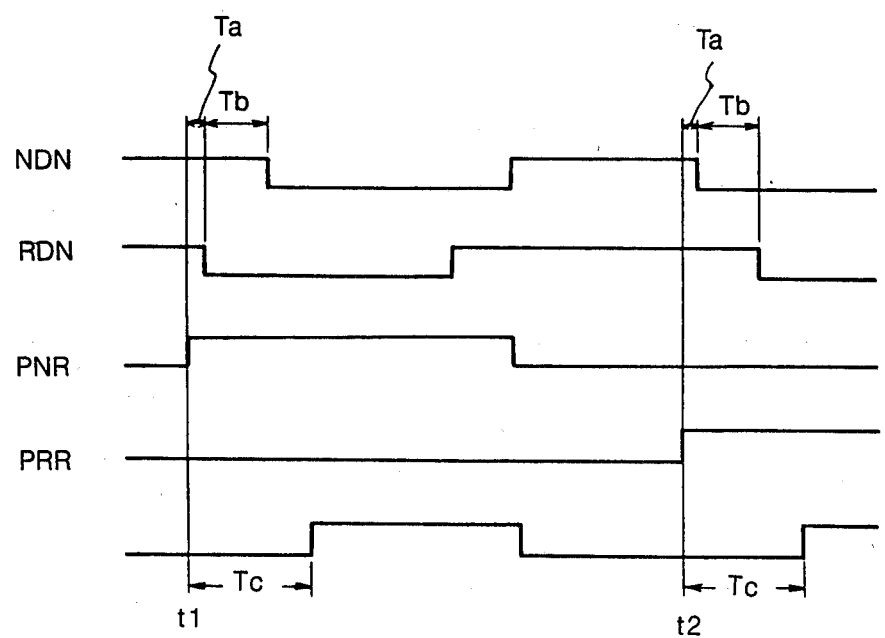
FIG. 8 is a timing chart for the workpiece palletizing operation.

FIG. 7 shows a sequence control system for controlling the palletizing operation, and FIG. 8 shows timing for the palletizing operation.

The sequence control system includes a robot control unit 101, a sequence control circuit 102, and a pallet driver 103 for moving the chain 41f (FIG. 5) in one direction or the other, the pallet driver 103 including a motor 103a, a gearing 103b, and a pulley 103c around which the chain 41f extends in driven relation.

The robot control unit 101 serves as a sequence controller which, while the robot system is in operation, is supplied from the sequence control circuit 102 with a single PUE indicative of completion of upward movement of the upper pallet member of a pallet, a signal PDE indicative of completion of downward movement of the upper pallet member, and a signal PPE indicative of completion of locating of the pallet in the workpiece loading and unloading position, and various other signals from the robot 6 and the numerically controlled machine tool. The robot control unit 101 is responsive to these input signals for issuing a command signal SSC for selecting sensors, a command signal PUC for lifting an upper pallet member, a command signal PDC for lowering an upper pallet member, a command signal PNR for feeding pallets, a command signal PRR for reversing pallets, and a command signal BAC for braking vertical movement of pallets. These command signals are supplied to relays RL1, RL11 through RL15 in the sequence control circuit 102 for actuating the relays.

The relays RL1 through RL5, and relays RL11 through RL15 have contacts rl1, rl2, normally open and closed contacts rl3, rl4, rl5, and normally open contacts rl11 through rl15, respectively. The sequence control circuit 102 also includes an AND gate AG, transistors $TR_1$ through $TR_3$ driving the relays RL4, RL3, RL5, respectively, receivers RV1 through RV3, a delay timer switch DTC, a motor drive circuit $MRC_1$ for selectively controlling upward and downward movement of an upper pallet member and for driving the motor 56, and a motor drive circuit $MRC_2$ for selectively controlling feeding and reversing movement of pallets and for driving the motor 103a.

Operation of the sequence control system for the palletizing operation will now be described with reference to FIGS. 5, 6A through 6C, 7 and 8.

When the double hand 63 (FIG. 5) reaches the workpiece loading and unloading position, the robot control unit 101 issues the command signal PUC for lifting the upper pallet member of the pallet 4c. The relay RL11 is actuated to enable the motor drive circuit $MRC_1$ to energize the motor 56 for lifting the upper pallet member of the pallet 4c. When an uppermost unmachined workpiece 3b on the upper pallet member of the pallet 4c as lifted is detected by the sensor 7a, the latter generates a signal WDS indicative of detection of the unmachined workpiece. The signal WDS is supplied via the receiver RV2 to the base of the transistor TR2, which is then turned on to actuate the relay RL3. The relay contact rl3 is actuated to supply the signal PUE to the robot control unit 101, and the motor drive circuit $MRC_1$ stops rotation of the motor 56. Upon generation of the signal PUE, the robot control unit 101 produces the brake signal BAC. Thereafter, the robot control unit 101 generates a signal for closing the fingers 63d in response to the signal PUE thus supplied. After confirming that the fingers 63d have gripped the unmachined workpiece 3b, the robot control unit 101 issues the signal PDC for lowering the upper pallet member of the pallet 4c. The signal PDC causes relay RL12 to be actuated to allow a motor reversing signal to be fed to the motor drive circuit $MRC_1$ for reversing the motor 56. Then, the upper pallet member of the pallet 4c is caused to move downwardly until the limit switc 60 is actuated by the guide rod 52. When the limit switch 60 is actuated, it produces the signal DCS which is fed through the receiver RV1 to the base of the transistor TR1, which is then energized. When the transistor TR1 is turned on, the relay contact rl4 is actuated to allow the signal PDE to be supplied to the robot control unit 101, and the motor drive circuit $MRC_1$ stops rotation of the motor 56. While the upper pallet member of the pallet 4c is being lowered, the grippers 63a, 63b are switched around through 180 degrees with respect to the wrist 64.

The robot control unit 101 then issues the signal PRR for reversing pallets in response to completion of the downward movement of the upper pallet member. The relay RL14 is actuated to supply the motor drive circuit $MRC_2$ with a motor reversing signal to reverse the motor 103a. At the same time, the relay RL2 is actuated to select the limit switch 41h for feeding pallets and to cause the delay timer switch DTC to start operating.

When one of the pallets is located in the workpiece loading and unloading position as shown in FIG. 5, the limit switches 41g, 41h are both actuated by the dog 41e as illustrated in FIG. 3B. With the pallet feeding command PNR issued at a time $t_1$ (FIG. 8), the chain 41f starts being fed along, and upon elapse of an interval of time Ta the limit switch 41h is turned off. The limit switch 41g is thereafter turned off upon elapse of a time interval Tb. Conversely, when the pallet reversing command PRR is issued at a time $t_2$ (FIG. 8), the chain 41f starts being reversed. After the time interval Ta, the limit switch 41g is turned off, and then the limit switch 41h is turned off upon further elapse of the time interval Tb. The time interval Tb is determined by the speed of travel of the chain 41f and the length of the dog 41e. In order to reverse a pallet into the workpiece loading and unloading position as shown in FIG. 5, it is necessary that the chain 41f be stopped when the limit switch 41h is actuated again a time interval (ta+Tb) after the pallet reversing command signal has been issued. Similarly, when it is necessary to feed a pallet along to the workpiece loading and unloading position, the chain 41f should be stopped when the limit switch 41g is actuated again the time interval (Ta+Tb) after the pallet feeding command signal has been generated. For the reasons described above, the delay timer switch DTC is set to generate an output of logic level "1" upon elapse of a time interval Tc which is longer than (Ta+Tb) after the pallet feeding command PNR or the pallet reversing command PRR has been issued (after the relays RL13, RL1 have been actuated).

When the motor 103a is reversed by the pallet reversing command, the chain 41f is moved in the reverse direction. The limit switch 41h issues the signal RDN indicative of completion of the chain reversing movement when the limit switch 41h is turned off and then on again. Since the output from the delay timer switch DTC is at a logic level "1" at time Tc, the AND gate AG produces an output of logic level "1" which energizes the transistor TR3 to thereby actuate the relay RL5. As a result, the relay contact rl5 is actuated to supply the robot control unit 101 with the positioning completion signal PPE, and simultaneously the chain 41f is stopped. Thus, the pallet 4b on which machined workpieces are placed is now located in the workpiece loading and unloading position.

Upon generation of the signal PPE, the robot control unit 101 issues the sensor selection signal SSC and the pallet lifting command PUC. The relays RL1, RL11 are actuated to select the sensor 7b and to raise the upper pallet member of the pallet 4b. When the sensor 7b detects an uppermost machined workpiece on the upper pallet member, the sensor 7b generates a signal WDS' indicative of detection of the machined workpiece. Then, the transistor TR2 is turned on to actuate the relay RL3 for generating the signal PUE, whereupon the upward movement of the upper pallet member of the pallet 4b is arrested. The fingers 63c are opened under a command from the robot control unit 101 to unload a machined workpiece onto a stack of machined workpieces carried on the upper pallet member as lifted. When such an unloading operation has been finished, the robot control unit 101 issues the pallet lowering command PDC to lower the stacked machined workpieces. After the upper pallet member of the pallet 4b has been fully lowered, the pallet 4b is fed along back to the position shown in FIG. 5. The feeding operation of the pallets is basically the same as the reversing operation, and hence will not be described here in detail.

While in the above embodiment the motor 56 is turned on and off for controlling vertical movement of an upper pallet member under the control of detected signals supplied from the sensors 7a, 7b and the limit switch 60, the vertical movement of the upper pallet member may instead be controlled by way of positional servo control through computation of the distance that the upper pallet member vertically travels.

Figure 9A:
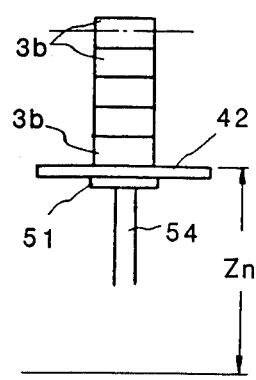
FIGS. 9A and 9B are side elevational views illustrative of the manner in which a pallet is moved up and down under servo control.
Figure 9B:
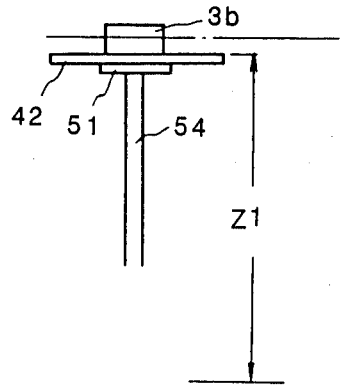
Figure 10:
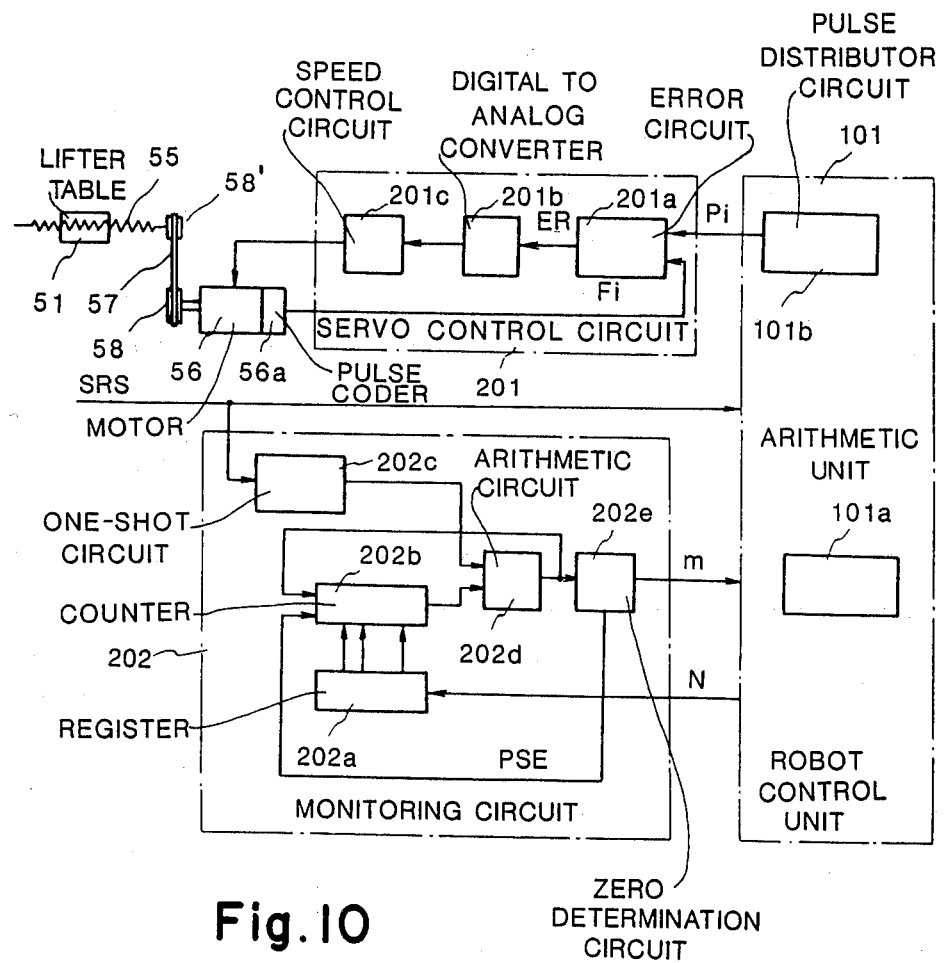
FIG. 10 is a block diagram of a servo control system for controlling the up-and-down movement of the pallet as shown in FIGS. 9A and 9B.

FIGS. 9A, 9B and 10 are illustrative of such servo control of vertical movement of the upper pallet member. It is now assumed that a number N is the maximum number of unmachined workpieces to be placed on each of the pallets. An upper pallet member 42 with such N unmachined workpieces carried thereon is required to move upwardly the distance Zn (FIG. 9A) until an uppermost workpiece reaches a position in which it can be gripped by the gripper, and an upper pallet member 42 with a single unmachined workpiece carried thereon is required to ascend the distance $Z_1$ until the unmachined workpiece reaches that position. The distance L that an upper pallet member on which the maximum number of m unmachined workpieces (m is a number between 1 and N) are placed should travel upwardly or downwardly before reaching the position in which an uppermost workpiece can be held by the gripper, can then be expressed by the following equation:

$$L = \left(\frac{Z1 - Zn}{N - 1}\right) \cdot (N - \underline{m}) + Zn$$

Thus, the distance L can be derived by the equation (1) by teaching measured Z1 and Zn and the number N to the robot control unit 101 and by monitoring the number m of remaining unmachined workpieces on the upper pallet member. With the distance L being determined, the upper pallet member can be positionally controlled by way of pulse distribution control in known NC control.

FIG. 10 shows a servo control system for effecting the above servo control operation. Like or corresponding parts in FIG. 10 are denoted by like or corresponding reference characters in FIG. 4. The servo control system includes a robot control unit 101 to which the parameters N, Z1 and Zn have already been taught. The robot control unit 101 includes an arithmetic unit 101a for effecting arithmetic operations based on the equation (1), and a pulse distributor circuit 101b for distributing pulses based on the computed distance L. A servo control circuit 201 an error circuit 201a for effecting arithmetic operations on the difference between a distributed pulse Pi and a feedback pulse Fi generated from a pulse coder 56a each time the motor 56 makes a predetermined number of revolutions, and for storing the result of the arithmetic operations, a digital-to-analog converter 201b for converting an error ER supplied from the error circuit 201a into a corresponding analog signal, and a speed control circuit 201c. The servo control system also comprises a circuit 202 for monitoring the number of remaining unmachined workpieces, the monitoring circuit 202 including a register 202a in which the number N for unmachined workpieces is set, a counter 202b in which the number N is preset, a one-shot circuit 202c for producing a signal of logic level "1" when servicing by the robot system is finished after a signal SRS has been generated which is indicative of a request for servicing by the robot system, an arithmetic circuit 202d for counting down the count in the counter 202b each time the one-shot circuit 202c produces a signal of logic level "1" and for setting the result in the counter 202b, and a zero determination circuit 202e for issuing the result of the arithmetic operation in the arithmetic circuit 202d as the number m of remaining unmachined workpieces and for producing a preset enable signal PSE for presetting in the counter 202b the number N which has been set in the register 202a when the result of the arithmetic operation is zero.

In operation, the robot control unit 101 is supplied with the number m of remaining unmachined workpieces which has been computed by the monitoring circuit 202. When the robot servicing request signal SRS is issued, the robot control unit 101 effects arithmetic operations based on the equation (1) and supplies the result of the arithmetic operations, or a signal indicative of the distance L to the pulse distributor 101b. Thereafter, as with the known NC control positioning procedure, the upper pallet member is lifted, and then is lowered after an uppermost unmachined workpiece is held by the gripper. While the above servo control is described as being applied to the loading of unmachined workpieces, it is also applicable to the unloading of machined workpieces onto the upper pallet member as lifted.

With the arrangement of the present invention, an industrial robot system does not occupy a large space for installation, is relatively simple in structure, relatively small in size, and less costly to construct.

Although certain preferred embodiments have been shown and described in detail, it should be understood that many changes and modifications may be made therein without departing from the scope of the appended claims.

What we claim:

1. A robot system for use with a machine tool having a spindle, comprising:
    a robot having a body for being mounted on the machine tool, an arm pivotally mounted on said body and rotatable in a plane transverse to an axial direction of the spindle of the machine tool, and a hand mounted on a distal end of said arm for gripping a workpiece and transferring the workpiece to the machine tool;
    a workpiece feeder disposed adjacent to said robot and movably supporting a succession of pallets for carrying unmachined and machined workpiece thereon, said workpiece feeder including a first mechanism for moving said pallets along a path on said workpiece feeder and for positioning said pallets, one at a time, in a first position in which an unmachined workpiece can be picked up from the pallet by said hand or a machined workpiece can be unloaded from said hand onto the pallet, and a second mechanism for moving the pallet toward said hand in said first position for allowing said hand to pick up the unmachined workpiece and unload the machined workpiece, and for moving said pallet away from said hand, and a DC motor for driving said second mechanism;
    a first circuit for controlling said DC motor; and
    a second circuit for controlling said first circuit on the basis of a distance L of movement of said pallet toward and away from said hand, said distance L being derived from the number N which is the maximum number of workpieces carried on said pallet, the distance Zn that said pallet with the N workpieces carried thereon moves until an uppermost workpiece reaches a second position in which the uppermost workpiece can be picked up by said hand, the distance Z1 that said pallet moves until a lowermost workpiece reaches said second position, and the number m of workpieces currently being carried on said pallet, said second circuit being capable of storing, in advance, data on said number N and said distances Zn, Z1 and monitoring said number m.

2. A robot system according to claim 1, wherein said distance L can be computed by the equation:

$$L = \left(\frac{Z1 - Zn}{N - 1}\right) \cdot (N - \underline{m}) + Zn$$

* * * * *

UNITED STATES PATENT AND TRADEMARK OFFICE
CERTIFICATE OF CORRECTION

PATENT NO. : 4,576,537
DATED : March 18, 1986
INVENTOR(S) : HAJIMU INABA et al.

It is certified that error appears in the above-identified patent and that said Letters Patent is hereby corrected as shown below:

FRONT PAGE [57] ABSTRACT
line 18, "and" s/b --hand--.

Col. 7
Line 33, "switc" s/b --switch--.

Col. 8
Line 3, "(ta" s/b --(Ta--.

Col. 9
Line 6, delete "the maximum";
Line 7, delete "number of";
Line 7, "m" (both occurrences) s/b --$\underline{m}$--;
Line 20, "m" s/b --$\underline{m}$--;
Line 57, "m" s/b --$\underline{m}$--;
Line 63, "m" s/b --$\underline{m}$--.

Col. 10
Line 31, "workpiece" s/b --workpieces--;
Line 56, "m" s/b --$\underline{m}$--;
Line 60, "m" s/b --$\underline{m}$--.

Signed and Sealed this

First Day of July 1986

[SEAL]

Attest:

DONALD J. QUIGG

Attesting Officer

Commissioner of Patents and Trademarks